United States Patent

Charkey et al.

[11] Patent Number: 5,863,676
[45] Date of Patent: Jan. 26, 1999

[54] CALCIUM-ZINCATE ELECTRODE FOR ALKALINE BATTERIES AND METHOD FOR MAKING SAME

[75] Inventors: Allen Charkey, Brookfield; Dwaine K. Coates, Danbury, both of Conn.

[73] Assignee: Energy Research Corporation, Danbury, Conn.

[21] Appl. No.: 828,801

[22] Filed: Mar. 27, 1997

[51] Int. Cl.⁶ .................... H01M 4/42; H01M 4/48
[52] U.S. Cl. .................... 429/229; 429/231; 423/622; 427/126.3
[58] Field of Search .................... 423/622; 429/229, 429/231; 427/126.3

[56] References Cited

U.S. PATENT DOCUMENTS

| | | |
|---|---|---|
| 1,316,760 | 9/1919 | Benner et al. . |
| 3,516,862 | 6/1970 | van der Grinten ............ 136/30 |
| 3,607,409 | 9/1971 | Hamlen et al. ............ 429/229 |
| 3,703,413 | 11/1972 | Arrance ............ 429/231 X |
| 3,816,178 | 6/1974 | Maki et al. ............ 136/30 |
| 3,870,564 | 3/1975 | Takamura et al. ............ 136/30 |
| 4,041,221 | 8/1977 | Berchielli et al. ............ 429/206 |
| 4,084,047 | 4/1978 | Himy et al. ............ 429/206 |
| 4,091,193 | 5/1978 | Horowitz et al. ............ 429/219 |
| 4,279,978 | 7/1981 | Dodin et al. ............ 429/248 |
| 4,292,357 | 9/1981 | Erisman et al. ............ 428/124 |
| 4,418,130 | 11/1983 | Soltis et al. ............ 429/206 |
| 4,735,876 | 4/1988 | Miura et al. ............ 429/206 |
| 5,045,170 | 9/1991 | Bullock et al. ............ 204/280 |
| 5,460,899 | 10/1995 | Charkey ............ 429/59 |
| 5,556,720 | 9/1996 | Charkey ............ 429/59 |

FOREIGN PATENT DOCUMENTS 2180940  11/1973  France .

OTHER PUBLICATIONS

Patent Abstracts of Japan, JP–A–58 137963, vol. 007, No. 251, Aug. 16, 1983.

Journal of the Electrochemical Society, Oct. 1986, USA, vol. 133, No. 10, pp. 1989–1995, E.G. Cagnon "Effects of KOH Concentration on the Shape Change and Cycle Life of Zn/NiOOH Cells".

Primary Examiner—Stephen Kalafut
Attorney, Agent, or Firm—Robin, Blecker & Daley

[57] ABSTRACT

A zinc active material containing a calcium-zincate constituent is formed external of a battery. The zinc active material is used as the active material for a zinc electrode used in the battery.

35 Claims, 4 Drawing Sheets

5,863,676

CALCIUM-ZINCATE ELECTRODE FOR ALKALINE BATTERIES AND METHOD FOR MAKING SAME

TECHICAL FIELD OF THE INVENTION

This invention relates to electrochemical energy storage devices and, in particular, to devices of this type which contain a zinc electrode.

BACKGROUND ART

Many types of electrochemical storage devices containing zinc electrodes are known and have been practiced in the art. These electrochemical energy storage devices may be electrically or mechanically rechargeable (secondary batteries) or not rechargeable (primary batteries). Typical zinc electrodes used in these devices include nickel-zinc, silver-zinc, zinc-oxygen, zinc-air, zinc-mercuric-oxide, zinc-carbon and zinc-manganese-oxide.

In rechargeable batteries, the zinc electrode exhibits a relatively short charge/discharge cycle life due to the solubility of the zinc in the alkaline battery electrolyte. During battery charge/discharge cycling, zinc is dissolved in the alkaline electrolyte and then re-plated onto the electrode. The zinc does not necessarily re-plate back to the same place from which it was dissolved. This results in a redistribution of the zinc active material over the surface of the electrode which can cause lower cell capacity, reduced cycle life and premature cell failure.

Many factors influence the zinc redistribution process, known as shape change. These factors include cell design and construction, the type of separator used, thermal effects, electrolyte concentration gradients, current density distribution and others. The complex nature of the process and the many factors and variables which affect it, make it very difficult to control.

A number of approaches have been tried including a variety of electrode additives, electrolyte additives and separator types. Other more elaborate approaches involve electrode, cell, battery and system designs. Illustrative of these are circulating zinc-slurry type batteries and mechanically rechargeable batteries in which the spent zinc anode is physically replaced with fresh zinc.

Zinc electrode additives previously used include calcium-hydroxide and others. U.S. Pat. No. 3,516,862 issued to W. Van der Grinten, discloses adding calcium-hydroxide to the zinc-oxide active material mixture. Also U.S. Pat. No. 5,460,899 issued to Allen Charkey and assigned to the same assignee hereof, discloses a method of making a calcium-hydroxide/zinc-oxide electrode in a sealed nickel-zinc cell. In both cases, the zinc electrode is fabricated by combining calcium-hydroxide and zinc-oxide into the electrode mixture and forming calcium-zincate in situ in the alkaline electrolyte-activated cell.

Calcium-hydroxide in combination with zinc-oxide forms an insoluble phase known, and identified by x-ray diffraction, as calcium-zincate, having the structural formula $Ca[Zn(OH)_3]_2 \cdot 2H_2O$. This relatively insoluble structure effectively ties up the zincate anion keeping it from diffusing into the bulk electrolyte where it is lost from the electrode. The calcium-zincate structure thus helps to hold the zinc active material in place on the electrode where it can be electrochemically utilized to provide energy storage capacity.

In prior approaches, calcium-hydroxide is added to the zinc-oxide active material during electrode fabrication. The electrode comprising the mixture of calcium-hydroxide and zinc-oxide is then incorporated into an alkaline electrolyte battery. Over the course of electrical charge/discharge cycling of the battery, the calcium-hydroxide, in combination with the zinc-oxide active material, then forms an insoluble phase of calcium-zincate, in situ. However, the conversion of the calcium-hydroxide and zinc-oxide to calcium-zincate is non-uniform, due to the effects of current density distribution, electrolyte concentration gradients and other factors.

There are additional disadvantages in using the in situ procedure for forming the calcium-zincate additive. One disadvantage is the dissolution of zinc active material into the battery electrolyte. This occurs during wetting down of the cell with electrolyte and during the initial cycles prior to complete conversion of the calcium-hydroxide to calcium-zincate. It results in loss of electrochemical zinc capacity. Another disadvantage is the changes that occur in the electrolyte concentration and distribution due to the consumption of water from the battery electrolyte. These disadvantages reduce battery charge/discharge cycle life.

It is, therefore, an object of the present invention to provide an improved zinc electrode active material containing calcium-zincate, and a method of making same.

It is a further object of the present invention to provide a zinc electrode and zinc battery incorporating such improved zinc electrode active material.

SUMMARY OF THE INVENTION

In accordance with the principles of the present invention, the above and other objectives are realized in an active material for a zinc electrode of a battery in which the active material contains a calcium-zincate constituent formed externally of the battery. The calcium-zincate constituent is created during active material formation external of the battery via a method which utilizes zinc-oxide and a calcium based material as starting materials and which selectively treats these materials.

A zinc electrode comprising the zinc active material and a battery incorporating the zinc electrode are also described.

BRIEF DESCRIPTION OF THE DRAWINGS

The above and other features and aspects of the present invention will become more apparent upon reading the following detailed description in conjunction with the accompanying drawings in which:

FIG. 3 illustrates a zinc electrode made with the zinc active material of FIG. 1;

DETAILED DESCRIPTION

Figure 1:
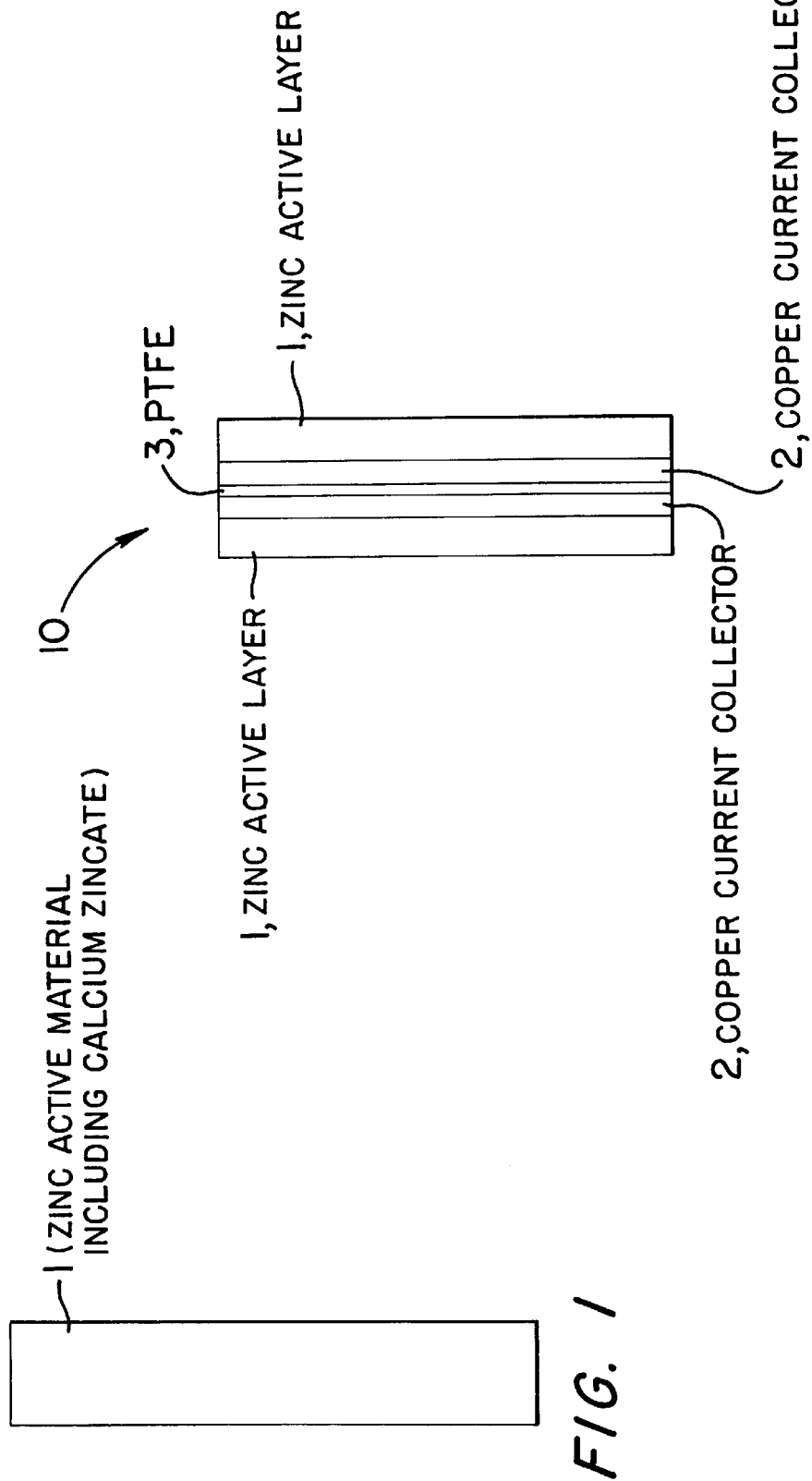
FIG. 1 illustrates a zinc active material containing calcium-zincate in accordance with the principles of the present invention.

FIG. 1 shows a zinc active material 1 in accordance with the principles of the present invention. More particularly, in accord with the invention, the zinc active material 1 contains a calcium-zincate constituent which is formed external of the battery in which the zinc active material 1 is to be used.

Preferably, the calcium-zincate constituent is an insoluble calcium-zincate/zinc-oxide material formed from a calcium based component and zinc-oxide.

By forming the insoluble calcium-zincate constituent prior to battery construction, the solubility of the zinc active material in the alkaline electrolyte of the battery is reduced. Moreover, a more complete conversion of the calcium based material and the zinc-oxide to calcium-zincate is obtained as compared to in situ formation in which conversion occurs via the aqueous potassium-hydroxide electrolyte and subsequent electrical cycling of the battery.

The electrolyte concentration of the battery is also more stable, since the electrolyte is no longer required for the conversion process. If conversion is carried out in situ there normally occurs an increase in the potassium-hydroxide electrolyte concentration in the battery from typically 20% to about 28% because water is consumed in the chemical conversion. This increase in concentration can cause concentration gradients of potassium-hydroxide and potassium-zincate resulting in non-uniformity of zinc deposition and shape change beginning as early as the first charging of the battery. This is all avoided through formation of the active material 1 external of the battery.

Figure 2:
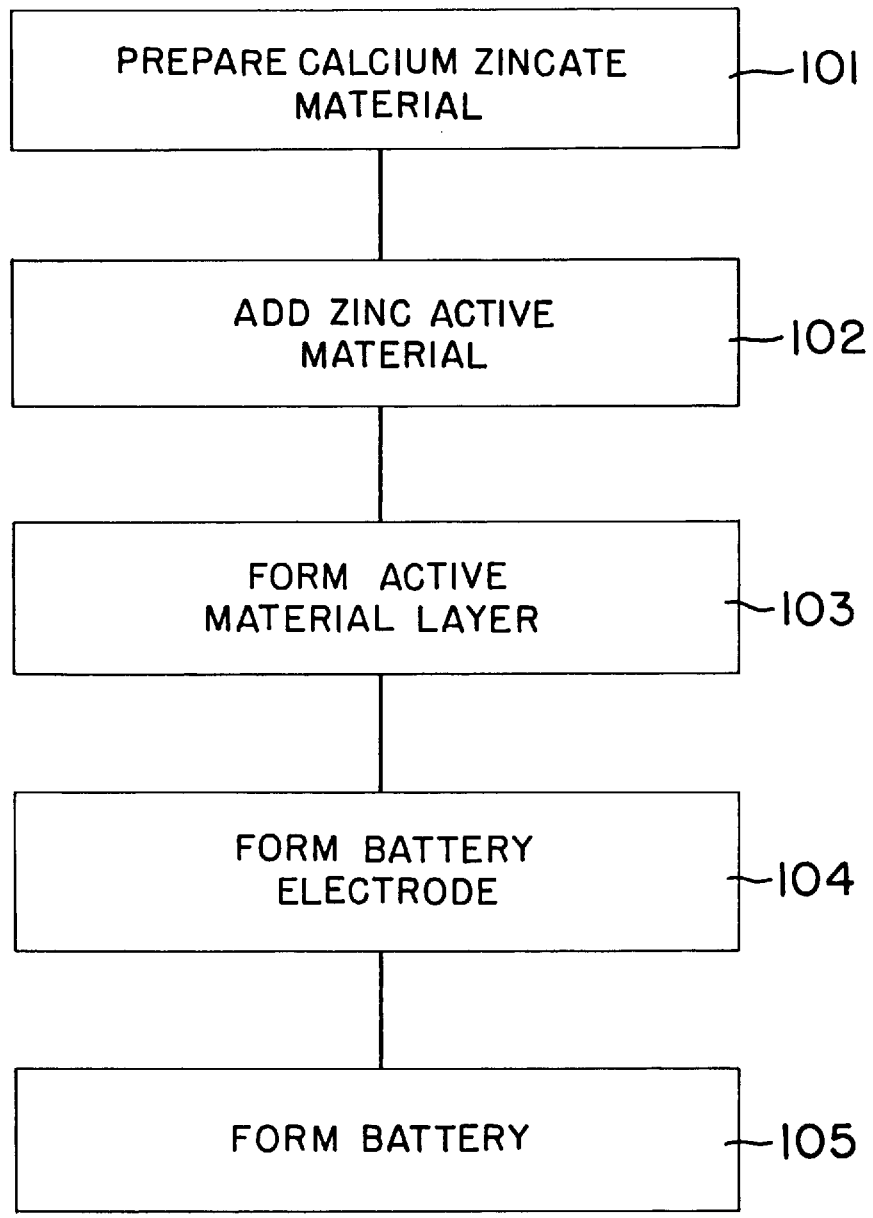
FIG. 2 illustrates a flow chart of the processing steps for forming the zinc active material of FIG. 1.

In accordance with the invention and as shown in the flow diagram of FIG. 2, the active material 1 is formed in a step 101 by first preparing the calcium-zincate material. This is accomplished by converting a zinc oxide active material into the zincate. A preferable conversion technique is either by aqueous alkaline treatment with calcium-hydroxide and potassium-hydroxide or by direct high temperature firing of the zinc-oxide with calcium-oxide or calcium-hydroxide. These conversion techniques result in the desired calcium-zincate material which also contains remaining zinc oxide and calcium-hydroxide or calcium-oxide. It should be noted, moreover, that other conversion techniques, as well as other active starting materials, for providing the calcium-zincate are within the contemplation of the invention.

The calcium-zincate, $Ca[Zn(OH)_3]_2 \cdot 2H_2O$, prepared as above and identified by x-ray diffraction, is then added to an additional electrode active material mixture in step 102 so that it is present in the percentage range of 30–60 percent by weight. In the preferred construction, the additional electrode active material is comprised of zinc and/or zinc-oxide, additives such as lead-oxide or bismuth-oxide and a binder. A preferred binder is polytetrafluoroethylene (PTFE), in the range of 1–5 percent by weight.

The composite mixture of these materials is then formed in step 103 into an integral layer. Preferably, the layer is in the form of a three-dimensional fibrillated structure. This is accomplished by imparting shearing forces into the mixture which causes fibrillation of the binder. Shearing forces can be imparted to the mixture by heat, pressure and/or mechanical treatment, or a combination thereof, by a number of procedures such as blending, extruding, milling, calendering, pressing, rolling or other methods which would impart work to the material and cause fibrillation of the binder.

The active material layer 1 thus formed is then incorporated in step 104 into a battery electrode. This is accomplished by pressing the active layer onto a current collector, which can be made of perforated copper or other conductive material.

Once the electrode is formed, it is used with a suitable positive electrode, a separator and an electrolyte to form a completed battery in a step 105. The electrolyte of the completed battery is preferably a low concentration of aqueous potassium-hydroxide in the range of 10-30 percent by weight. The positive electrode of the battery, in turn, can comprise nickel/nickel oxide, silver/silver oxide, manganese-oxide, oxygen or other constituents. The battery is then, electrically charged to store energy for later discharge to provide power to an electrical load. The charge/discharge cycle of the battery can be repeated for multiple usage.

ILLUSTRATIVE EMBODIMENT OF THE INVENTION

Calcium-zincate, having the structural formula $Ca[Zn(OH)_3]_2 \cdot 2H_2O$, is first formed from calcium-hydroxide and zinc-oxide. An alkaline conversion of the zinc-oxide and calcium-hydroxide to calcium-zincate by suspension in an aqueous solution of potassium-hydroxide is performed. More particularly, a stoichiometric mixture of calcium-hydroxide and zinc-oxide is added to an aqueous solution of potassium-hydroxide. The concentration of the potassium-hydroxide is in the range of 5–30 percent by weight. The calcium-hydroxide and zinc-oxide form a saturated solution/suspension.

This solution/suspension is placed in a covered glass beaker, warmed to a temperature in the range of 40°–80° C. and stirred with a magnetic stir bar. The solution/suspension is stirred for a period in the range of 48–72 hours. At the conclusion of this period, the stirred mixture is filtered (Whatman #2 filter paper), washed at least twice with deionized water and oven-dried in a covered container at or below a temperature of about 80° C. The dry solid material thus formed contains calcium-zincate, zinc-oxide and unconverted calcium-hydroxide. A particular material formed in this manner and analyzed by x-ray diffraction contained 40% by weight $Ca[Zn(OH)_3]_2 \cdot 2H_2O$, 50% by weight ZnO with the remaining 10% by weight unconverted $Ca(OH)_2$.

The dry solid calcium-zincate mixture is then dry blended with additional zinc-oxide, lead-oxide and PTFE binder. One usable combination of these materials is 85 equivalent weight percent of the prepared calcium-zincate material, 6–12 weight percent of lead-oxide and 1–4 weight percent PTFE, with the remainder being zinc-oxide. Other electrode compositions may also be used. For example, other components or constituents may be added or substituted into the mixture such as bismuth-oxide, mercury-oxide, indium-hydroxide or others.

The dry blended powders are then formed into an integral layer or matrix by fibrillation of the binder. This is accomplished via a plastic roll-bonding process as described in U.S. Pat. No. 4,976,904. The result is the desired zinc active layer containing calcium-zincate.

The zinc active layer is then laminated to one face of a current collector which is formed from a perforated copper foil having a thickness of 0.003 inches. The current collector includes a 0.005 inch thick metallic silver electrical tab which has been attached by resistance welding. The perforated copper foil is preferably plated with a metal such as silver, lead or bismuth.

A PTFE film element having a thickness of 0.005 inch is then bonded to the opposite face of the current collector to form a hydrophobic gas recombination element. This assembly constitutes a first split electrode part of a composite calcium-zincate/zinc-oxide electrode assembly. A second split electrode part is formed identically to the first part, except that a hydrophobic PTFE film element is not bonded to the current collector. The composite electrode is formed by abutting the first and second split electrode parts so that the PTFE film element of the first split electrode part abuts the current collector of the second split electrode part.

Figure 4:
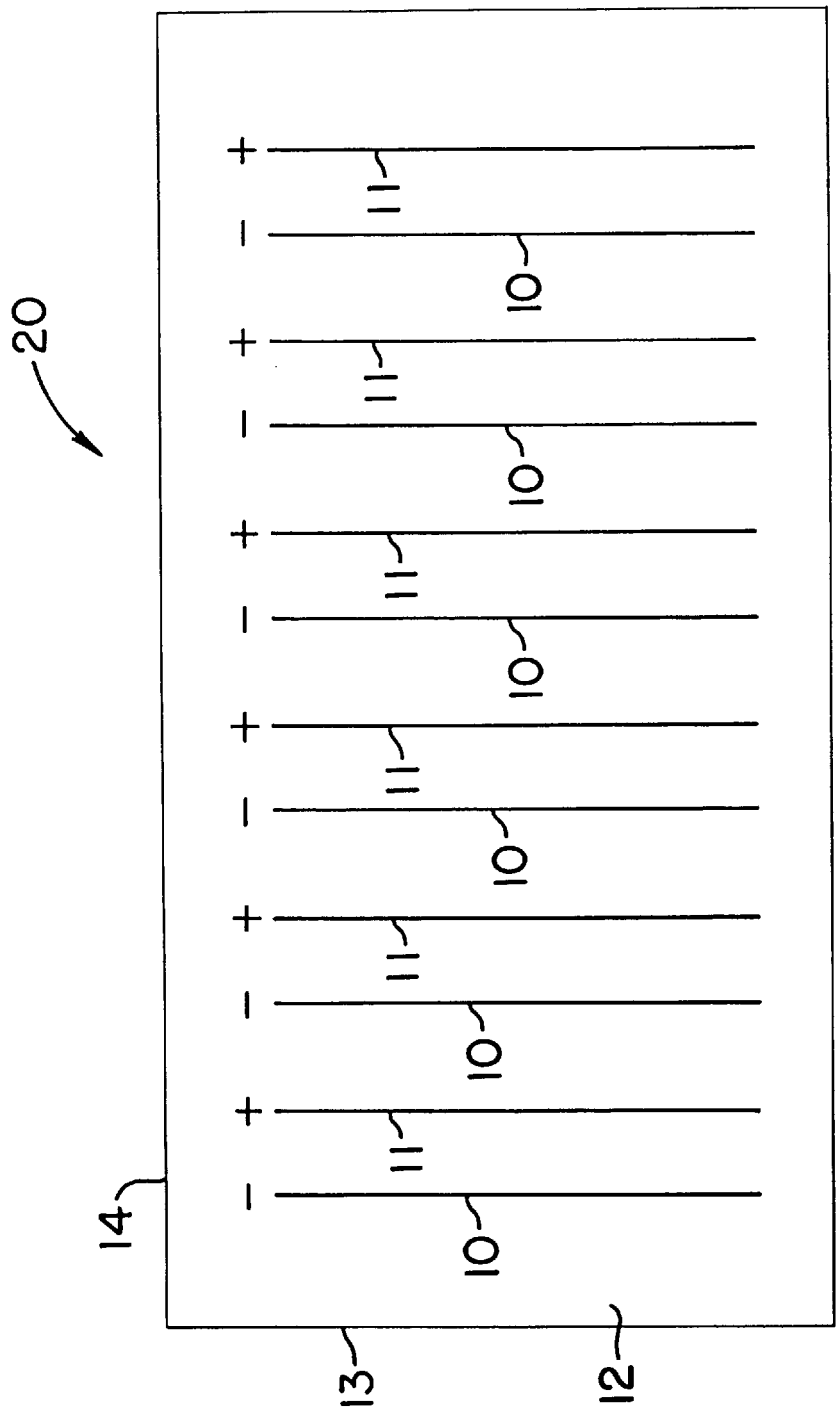
FIG. 4 illustrates a battery constructed with the zinc electrode of FIG. 3.

FIG. 3 shows a composite electrode assembly 10 comprising the active layers 1, the current collectors 2 and the PTFE element 3. As schematically shown in FIG. 4, a nickel-zinc battery 20 is fabricated using six such composite zinc electrodes assemblies 10. These are assembled together with appropriate positive electrodes 11, separators and an electrolyte 12 in a battery case 13 with a cover 14.

The positive electrodes are nickel/nickel-oxide electrodes (also known as nickel-hydroxide electrodes). The nickel/nickel-oxide positive electrodes are formed of 66 weight percent nickel-hydroxide, 30 weight percent graphite and 4 weight percent PTFE. The graphite can be coated with 5 weight percent of cobalt-oxide as described in U.S. Pat. No. 4,546,058. The electrodes are fabricated by the plastic roll-bonding process as described in the '904 patent and have nickel foil (0.01 inches thick) electrical attachment tabs.

The separators used for the six positive electrodes comprises three layers of Celgard® 3406 microporous polypropylene film as manufactured by Hoechst-Celanese Chemical Company, Charlotte, N.C. The Celgard® film is 0.001 inches in thickness. The separators for the zinc negative electrode assemblies, in turn, include two layers of an absorbent nylon material, such as Pellon® , manufactured by Freudenberg, Lowell, Mass.

The wrapped positive electrodes and negative zinc electrode assemblies are interspersed in an alternating fashion to form a battery electrode stack assembly. This stack assembly is then inserted into a molded plastic prismatic rectangular battery case. A cover is fitted and solvent welded to the battery case to provide a finished nickel-zinc battery. Electrical attachment is provided by battery terminal feed-throughs molded into the cell case cover. The cover also includes a small through-hole opening to allow the introduction of electrolyte into the battery after the battery case to cover seal is made. The cover also contains a resealable pressure safety vent which allows the safe operation of the battery in a sealed condition.

The battery case is filled with a 20 weight percent aqueous solution of potassium-hydroxide, containing 1 percent by weight lithium-hydroxide, which serves as the alkaline battery electrolyte. After introduction of the battery electrolyte, the through-hole in the cover is sealed with a plug and solvent-welded into place.

The completed nickel-zinc battery is then placed on a cyclic charge/discharge test regime. The battery contains approximately 66 grams of calcium-zincate/zinc-oxide active material, which is an excess of the negative active material. The battery electrical capacity is rated based on the limiting reactant, which in this case is the positive nickel/nickel-oxide electrode material. The battery is rated at a nominal capacity of 13.5 Ampere-hours based on 52 grams of positive active material.

Figure 5:
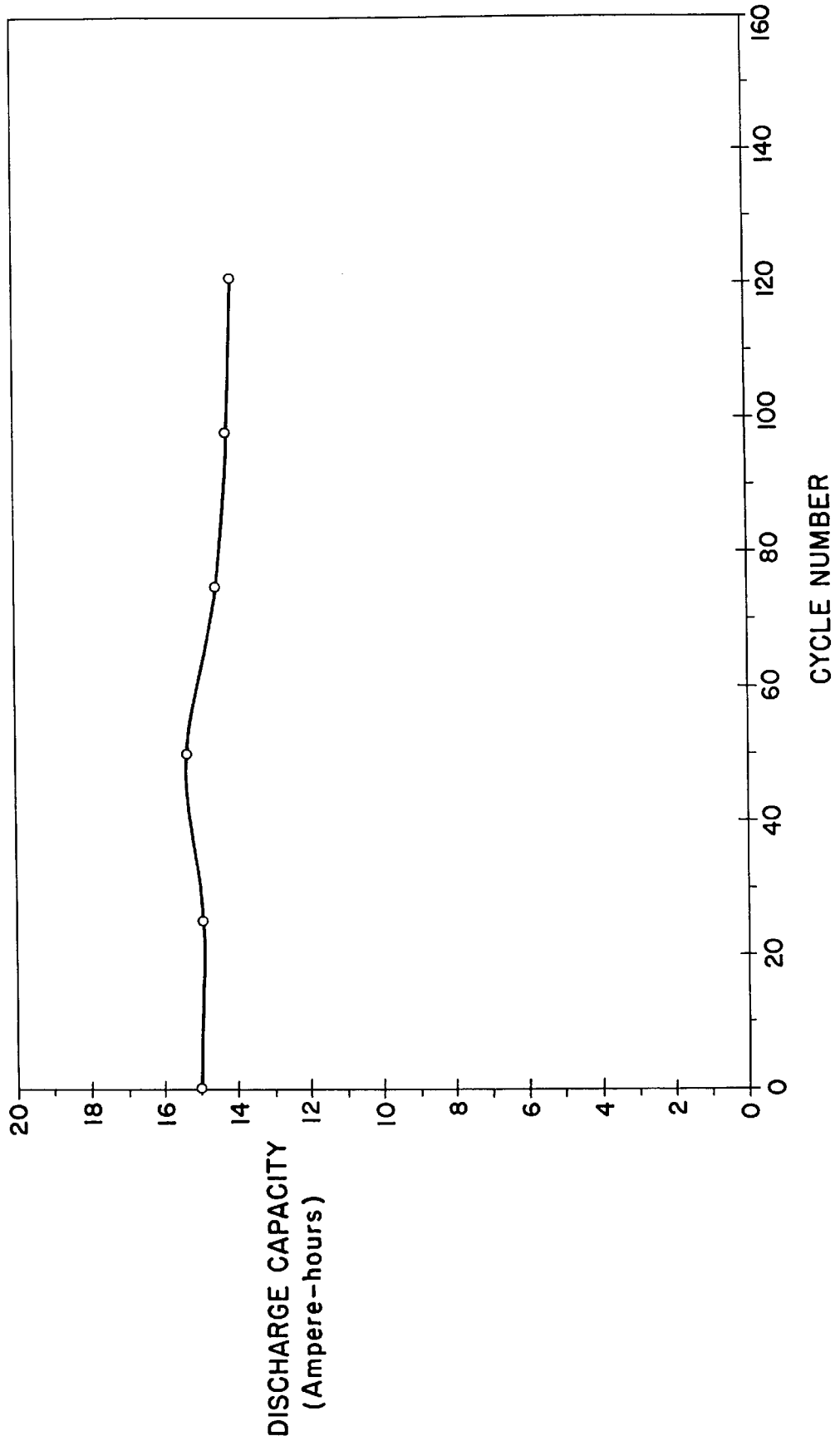
FIG. 5 shows the cell discharge capacity as a function of cycling of the battery of FIG. 4.

The battery is charged at a 3 hour rate and discharged at a rate to give an equivalent depth-of-discharge of 80% based on the rated cell electrical capacity. The cell discharge capacity as a function of cycling is shown in FIG. 5. After more than 170 charge/discharge cycles the battery delivers above the rated capacity.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. An example would be other types of batteries, incorporating a zinc electrode, such as a silver-zinc or zinc-manganese-oxide batteries. Also, additional metal oxide additives to the zinc active material might be thallium oxide, tin-oxide, tin-dioxide and cadmium-oxide.

What is claimed is:

1. An active material for use in an electrode of a battery, said active material being formed external of said battery and comprising: a calcium-zincate constituent; a zinc oxide and/or zinc constituent; one of a calcium-hydroxide or calcium-oxide constituent and one of a lead-oxide, bismuth-oxide, indium-oxide, thallium-oxide, tin-oxide, tin-dioxide and cadmium-oxide constituent.

2. An active material in accordance with claim 1, further comprising:
    a binder.

3. An active material in accordance with claim 2 wherein:
    said calcium-zincate constituent is present in the range of 30–60 weight percent of said active material.

4. An active material in accordance with claim 3 wherein:
    said binder is polytetrafluorethylene.

5. An active material in accordance with claim 4 wherein:
    said binder is present in the range of 1–5 weight percent of the active material.

6. An active material in accordance with claim 3 wherein:
    said active material is in the form of a self-supporting layer and said binder is fibrillated.

7. An active material in accordance with claim 1 wherein:
    said calcium-zincate material is present in the range of 30–60 weight percent of said active material.

8. An electrode for a battery comprising:
    an active material, said active material being formed external of said battery and comprising: a calcium-zincate constituent; a zinc-oxide and/or zinc constituent; one of a calcium-hydroxide and calcium-oxide constituent; and one of a lead-oxide, bismuth-oxide, indium-oxide, thallium-oxide, tin-oxide, tin-dioxide and cadmium-oxide constituent.

9. An electrode in accordance with claim 8 wherein:
    said active material further comprises a binder.

10. An electrode in accordance with claim 9 wherein:
    said calcium-zincate constituent is present in the range of 30–60 weight percent of the active material.

11. An electrode in accordance with claim 10 wherein:
    said binder is polytetrafluoroethylene.

12. An electrode in accordance with claim 10 wherein:
    said binder is present in the range of 1–5 weight percent of the active material.

13. An electrode in accordance with claim 10 wherein:
    said active material is in the form of a self-supporting layer and said binder is fibrillated.

14. An electrode in accordance with claim 13, further comprising:
    a current collector affixed to said active material layer.

15. An electrode in accordance with claim 14 wherein:
    said current collector comprises a copper material.

16. An electrode in accordance with claim 8 wherein:
    said calcium-zincate constituent is present in a range of 30–60 weight percent of the active material.

17. A battery comprising:
    a positive electrode; and
    a negative electrode, said negative electrode comprising:
        an active material, said active material being formed external of said battery and comprising: a calcium-zincate constituent; a zinc-oxide and/or zinc constituent; one of a calcium-hydroxide and calcium-oxide constituent; and one of a lead-oxide, bismuth-oxide indium-oxide, thallium-oxide, tin-oxide, tin-dioxide and cadmium-oxide constituent.

18. A battery in accordance with claim 17 wherein:

said positive electrode comprises one of nickel/nickel-oxide, silver/silver-oxide, manganese-oxide and oxygen.

19. A battery in accordance with claim 17 wherein:

said active material further comprises a binder.

20. A battery in accordance with claim 19 wherein:

said calcium-zincate constituent is present in the range of 30–60 weight percent of the active material.

21. A battery in accordance with claim 20 wherein:

said binder is polytetrafluoroethylene.

22. A battery in accordance with claim 20 wherein:

said binder is present in the range of 1–5 weight percent of the active material.

23. A battery in accordance with claim 20 wherein:

said active material is in the form of a self-supporting layer and said binder is fibrillated.

24. A battery in accordance with claim 23 wherein:

said negative electrode further comprises a current collector affixed to said layer of active material.

25. A battery in accordance with claim 24 wherein:

said current collector comprises a copper material.

26. A battery in accordance with claim 17 wherein:

said calcium-zincate constituent is present in the range of 30–60 weight percent of the active material.

27. A method for forming an active material of an electrode of a battery comprising:

forming a calcium-zincate constituent external of the battery comprising direct temperature firing of zinc-oxide with one of calcium-oxide and calcium-hydroxide; and adding an active constituent to the calcium-zincate to form said active material, said active constituent containing a material which includes zinc, said material which includes zinc comprising zinc oxide.

28. A method in accordance with claim 27 in which wherein:

said calcium-zincate constituent is present in the range of 30–60 weight percent of said active material.

29. A method in accordance with claim 27 wherein:

said step of forming said calcium-zincate constituent includes: stoichiometric mixing calcium-hydroxide with zinc-oxide as a slurry in an aqueous potassium-hydroxide bath; heating said mixture; washing said mixture to remove excess potassium-hydroxide; and drying said mixture.

30. A method in accordance with claim 29 wherein:

said heating is carried out in a temperature range of 40°–80° C.

31. A method in accordance with claim 30 wherein:

said mixing occurs over a time period of 48–72 hours;

said washing is carried out at least twice with deionized water; and said drying is carried out in a covered container at or below a temperature of about 80° C.

32. A method in accordance with claim 27 wherein said active constituent further includes one or more of lead-oxide, bismuth-oxide, indium-oxide, thallium-oxide, tin-oxide, tin-dioxide and cadmium-oxide.

33. A method in accordance with claim 27 wherein:

said active constituent includes a binder;

and said method further includes: forming said active material into a layer with said binder being fibrillated.

34. A method in accordance with claim 33 wherein:

said binder is polytetrafluoroethylene.

35. A method in accordance with claim 33 further comprising:

pressing said layer of active material onto a current collector to form an electrode.

* * * * *